United States Patent [19]
Rhodes et al.

[11] Patent Number: 4,920,573
[45] Date of Patent: Apr. 24, 1990

[54] METHOD FOR GENERATING PERPENDICULAR SYNTHESIZED CROSS-SECTIONAL IMAGES

[75] Inventors: Michael L. Rhodes; Ada Kan; Eva Tivattanasuk, all of Los Angeles, Calif.

[73] Assignee: MPDI, Inc., Torrance, Calif.

[21] Appl. No.: 193,331

[22] Filed: May 9, 1988

[51] Int. Cl.$^5$ .............................................. G06K 9/00
[52] U.S. Cl. ................................... 382/6; 382/1; 382/25; 358/111; 358/112; 378/21; 378/38; 378/40; 378/901; 364/413.19; 364/413.22; 364/413.28
[58] Field of Search .................... 382/1, 6, 20, 22, 25, 382/26; 378/21, 22, 38, 39, 40, 901; 358/111, 112; 364/413.14, 413.16, 413.18, 413.19, 413.22, 413.28

[56] References Cited

U.S. PATENT DOCUMENTS

| | | | |
|---|---|---|---|
| 4,534,048 | 8/1985 | Welander et al. | 378/38 |
| 4,593,355 | 6/1986 | Chase | 364/414 |
| 4,661,967 | 4/1987 | Nishikawa | 378/40 |
| 4,663,720 | 5/1987 | Duret et al. | 364/413.28 |
| 4,674,046 | 6/1987 | Ozeki et al. | 364/414 |
| 4,703,424 | 10/1987 | Gullberg et al. | 378/901 |
| 4,710,876 | 12/1987 | Cline et al. | 364/414 |
| 4,722,056 | 1/1988 | Roberts et al. | 364/413.22 |
| 4,736,396 | 4/1988 | Boyd et al. | 378/4 |
| 4,739,481 | 4/1988 | Yoshitome | 364/413.19 |
| 4,752,879 | 6/1988 | Brunnett | 364/414 |
| 4,777,598 | 10/1988 | Keller et al. | 364/413.22 |

OTHER PUBLICATIONS

The International Journal of Oral & Maxillofacial Implants, Schwarz, et al., 2(3): 137, 1987.
The International Journal of Oral & Maxillofacial Implants, Schwarz, et al., 2(3): 143, 1987.

Primary Examiner—Leo H. Boudreau
Assistant Examiner—Jose L. Couso
Attorney, Agent, or Firm—Spensley, Horn, Jubas & Lubitz

[57] ABSTRACT

A method for generating synthesized cross-sectional images perpendicular to a line or curve that approximates the shape of a structure scanned by a non-intrusive cross-sectional image generating device, such as a CT, MR, or ultrasonic scanner. The inventive method involves three basic processes: generation of a set of perpendicular lines along an initial curve that approximates the curvature of the scanned structure; selection from each original scanned image of pixels corresponding to discrete points on each of the generated perpendicular lines; and interpolation between adjacent lines of pixels collected in the second step to generate a complete perpendicular cross-sectional image. The invention permits making a single pass through all axial image data, during which selected pixels for a perpendicular cross-sectional view are collected in a temporary data file for subsequent interpolation for display purposes.

5 Claims, 5 Drawing Sheets

METHOD FOR GENERATING PERPENDICULAR SYNTHESIZED CROSS-SECTIONAL IMAGES

BACKGROUND OF THE INVENTION

1. Field of the Invention

This invention relates to a method for generating synthesized cross-sectional images, and more particularly to a method for generating such images perpendicular to a line or curve that approximates the shape of a structure scanned by a non-intrusive crosssectional image generating device.

2. Related Art

In a number of fields, including the field of medicine, computer-assisted tomography (CT), magnetic resonance (MR), and ultrasonic scanners have been employed to generate images of the interior of objects in great detail but in a non-intrusive manner. For example, a CT scanner consists of an x-ray machine and a computer. The scanner takes x-rays in thin two-dimensional cross-sectional "slices". Digitized data representing each "slice" is recorded by the computer and can be displayed on a graphics screen. One such scanner is the General Electric Model 9800 CT Scanner. A CT examination usually consists of a series of these cross-sectional views, each slice adjacent to the next (similar to slices from a loaf of bread). Similar slices can be taken by MR or ultrasonic scanning.

Such scans have been particularly useful in the medical field, where digitized scan data has been reformatted to provide synthesized images of the scanned structure in a plane or along a curve different from the plane of the original scanned images.

For example, the reformation of digitized data from such scans has in the past been used to recast data from an axial CT scan of a spine. After reformation, a synthesized image of the spine can be viewed from the sagittal or coronal planes of the body, thus providing an internal cross-sectional "slice" oriented as a "front view" or a "side view" x-ray of the spine.

It is desirable to obtain reformed images of scans of other structures in the body, such as the mandible or maxilla. As described in the co-pending patent application entitled "Method for Representing Digitized Image Data" (Ser. No. 192,586), scanned image data from such structures can be modeled by the generation of an initial curve that approximates the curvature of the scanned structure. The initial curve can be generated in a number of ways, including selection by a user of numerous data points connected by straight line segments. Another method of generating the initial curve using a cubic spline algorithm is taught in the cited co-pending application.

It is believed that the prior art has taught the reformation of scan data only along such curves or lines that conform to the shape of the scanned structure, where the curve or line itself is used to select data from the scan images. However, it has been found desirable to generate synthesized cross-sectional images perpendicular to such a line or curve. For example, it is desirable to generate cross-sectional images of a highly curved scanned structure at points perpendicular to the local curvature of the structure. Previously, it was impossible to obtain exact cross-sectional images through the desired locations in such a highly curved structure. For example, when scanning the human jaw, only axial cross-sectional scan images perpendicular to the long axis of the body can be obtained with ease. Coronal or frontal CT or MR scans can be performed by tilting a patient's head and the scanner's gantry to produce scans nearly perpendicular to the axis of the jaw bone. Such views approximate the desired cross-sectional information, but are difficult to perform (especially in the older edentulous patient population). Such views are also lacking in that they are not true cross-sections along the curvature of the scanned structure. They are only estimates of true cross-sections distorted due to the curvature of the structure.

Thus, it is desirable to obtain cross-sectional synthesized images based upon lines or curves that are derived from a line or curve conforming to the curvature of a structure.

Further, it is desirable to obtain cross-sectional synthesized images of scanned highly curved structures, with such cross-sections being truly perpendicular to the local curvature of the scanned structure.

It is therefore an object of this invention to provide a means for generating such perpendicular synthesized cross-sectional images.

SUMMARY OF THE INVENTION

The present invention generates synthesized cross-sectional images from CT, MR, or ultrasonic image data that are perpendicular to a line or curve that approximates the shape of a scanned structure. The inventive method involves three basic processes: generation of a set of perpendicular lines along an initial curve that approximates the curvature of the scanned structure; selection from each original scanned image (in the preferred embodiment, an axial image "slice") of picture elements (or "pixels") corresponding to discrete points on each of the generated perpendicular lines; and interpolation between adjacent lines of pixels collected in the second step to generate a complete perpendicular cross-sectional image. In the preferred embodiment, the invention permits making a single pass through all axial image data, during which selected pixels for the perpendicular view are collected in a temporary data file for subsequent interpolation between axial slices.

These and other features, advantages, and details of the preferred embodiment of the present invention are set forth below. Once the concepts behind the invention are known, numerous additional innovations and changes will become obvious to one skilled in the art.

DESCRIPTION OF THE DRAWINGS

The invention will become better understood by reference to the following detailed description when taken in conjunction with the accompanying drawings showing the preferred embodiment of the invention.

DETAILED DESCRIPTION OF THE INVENTION

The inventive method can be implemented as a series of steps performed by a general purpose digital computer such as is found in many scanning instruments. The general requirements of such a computer are that it have data storage means (such as semiconductor or core memory, or a magnetic media storage device), input/output means for storing data to or fetching data from the data storage means, a processor means for manipulating data, and a display means for visually displaying selected data.

As noted above, in order to generate synthetic images perpendicular to an initial curve conforming to the curvature of CT, MR, or ultrasonic image data, three basic processes are involved: first, generation of a set of perpendicular lines along the initial curve that approximates the curvature of the scanned structure; second, selection from each original scanned image (in the preferred embodiment, an axial image "slice") of pixels corresponding to discrete points on each of the generated perpendicular lines; and third, interpolation between adjacent lines of pixels collected in the second step to generate a complete perpendicular cross-sectional image.

Figure 1:
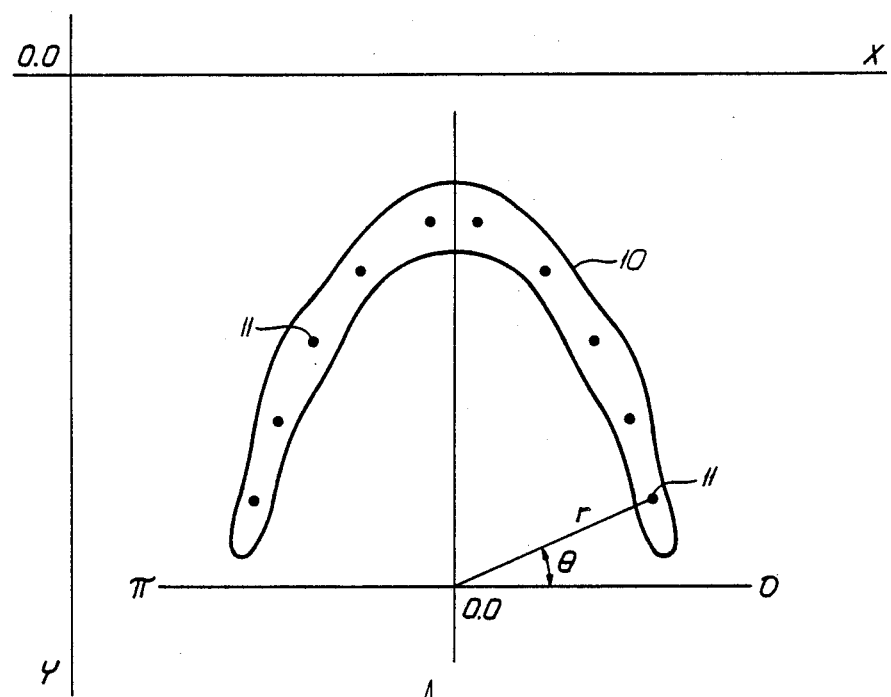
FIG. 1 is an outline view of a scanned image of a mandible, shown on a display screen.

In order to generate an initial curve through a scan of a highly curved structure, such as the mandible or maxilla, a normal scan is performed on the curved structure. For example, 30 to 40 axial "slices" of image data may be taken of a maxilla. Using the features of available scanning machines, a user selects one of the image slices (typically a slice from near the middle of the group of slices) for display on the scanner's display system. For example, FIG. 1 shows a sketch of a typical scanner display, having an Cartesian x,y coordinate system with the origin in the upper lefthand corner. Shown in outline form as being displayed is the image data obtained from scanning a maxilla 10.

Using the features available on a commercial scanner, a user may select a number of points 11 (for example, 5 to 10 points) by means of a light pen, mouse, or similar pointing device, that correspond to points on the displayed curved structure. These points represent the outline of a curve which the user desires to serve as an initial curve in reforming the scanned image data into alternative views. Generation of a curve that conforms to these data points can be done in any of a number of ways. For example, such generation could be by application of the method taught in the co-pending application entitled "Method for Representing Digitized Image Data", which defines such a curve in terms of a set of cubic polynomials.

The computer algorithm described below for implementing the preferred embodiment of the invention assumes that a curve conforming to the curvature of the scanned object has been initially defined. The description of the preferred embodiment will be in terms of cubic polynomials derived by application of the method taught in the cited co-pending application. However, the algorithm can be modified to accommodate virtually any initial description of such a conforming curve.

Figure 2:
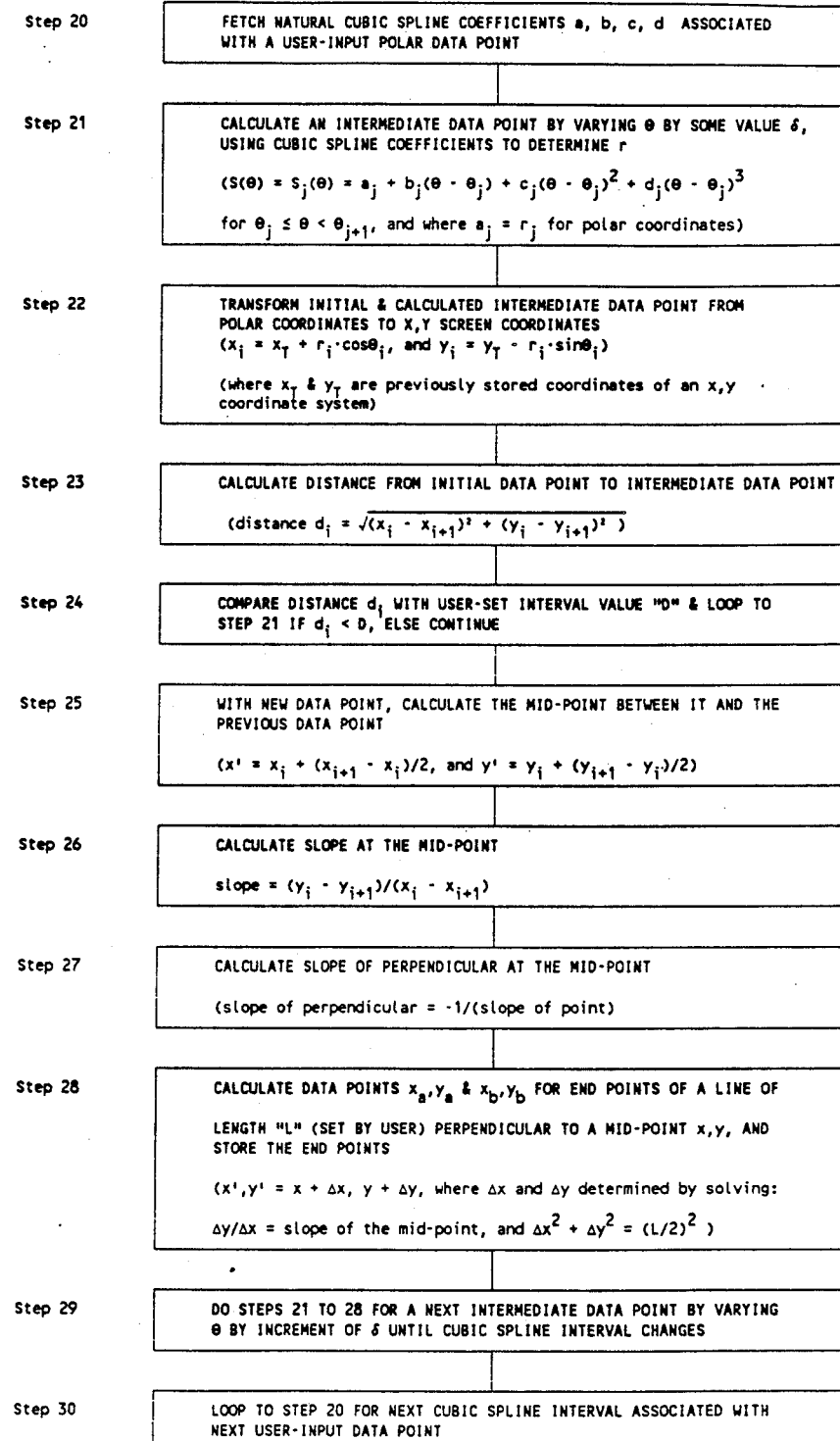
FIG. 2 is a flow chart of the Perpendicular Line Generation Procedure of the present invention.

In the preferred embodiment, the steps needed for generating the required set of lines perpendicular to an initial curve are described in the high-level flow chart in FIG. 2. The first step is to fetch previously calculated natural cubic spline coefficients a, b, c, d associated with a first data point (Step 20). The cubic spline coefficients are used to calculate an intermediate data point by adding to an initial $\theta$ some small amount $\delta$ (arbitrarily chosen to obtain adequate resolution without over-calculating intermediate data points) to calculate new values of the cubic spline polynomial $S(\theta)$ (Step 21). The polar coordinates of the initial data point and the calculated intermediate data point are transformed into screen coordinates (Step 22), and the distance "d" between the two points is calculated (Step 23). The distance "d" is compared to a user-set interval value "D" which defines the desired distance between the perpendicular cross-sectional views to be generated. If the minimum distance "D" has not been reached, the process loops to step 21 by incrementing $\theta$ by $\delta$ again (Step 24).

If the desired spacing has been reached, a perpendicular can be generated at the intermediate data point. However, in the implemented embodiment, a perpendicular is generated at the mid-point between an initial data point and the calculated intermediate data point, thus requiring a step to calculate the coordinates of the mid-point (Step 25).

Using the coordinates of the initial data point and the calculated intermediate data point, the slope at the mid-point is then calculated (Step 26). The negative inverse of the slope at the mid-point is the slope of the perpendicular at the mid-point (Step 27).

Using this calculated slope for the perpendicular, and the coordinates of the calculated mid-point, new data points representing the end-points of a line of length "L" (set by the user) are generated by traversing along each perpendicular a distance of L/2 on either side of the mid-point (Step 28). The new end-point coordinates are stored for latter use (Step 28), and the entire process is repeated for a next data point (Step 29).

Figure 3:
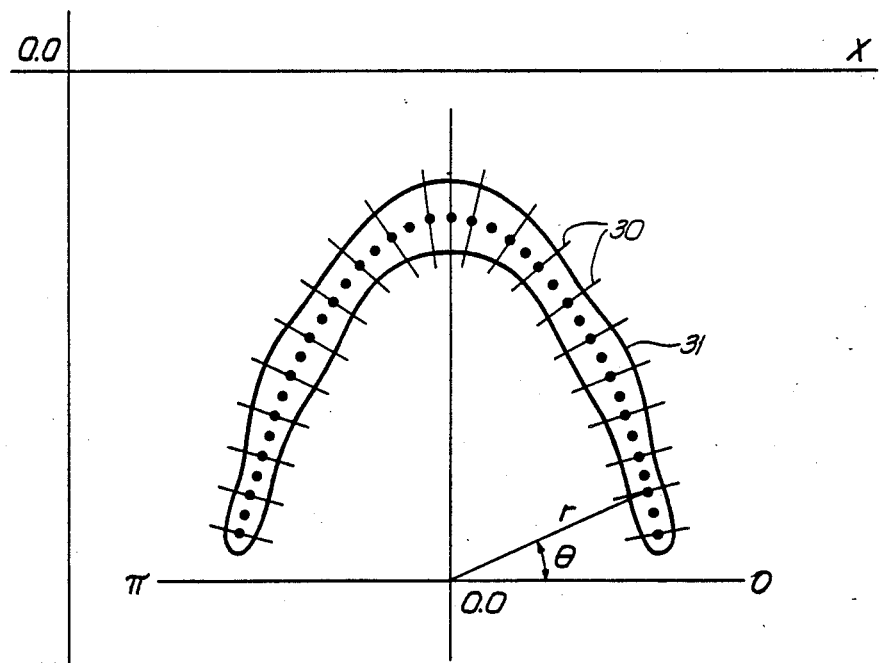
FIG. 3 is an outline view of the scanned image of FIG. 1, shown with a set of perpendicular lines generated by the procedure described in FIG. 2 superimposed.

The result of the procedure described in FIG. 2 is diagrammatically shown in FIG. 3, which shows the generated perpendicular lines 30 superimposed over a scan image 31.

Figure 4:
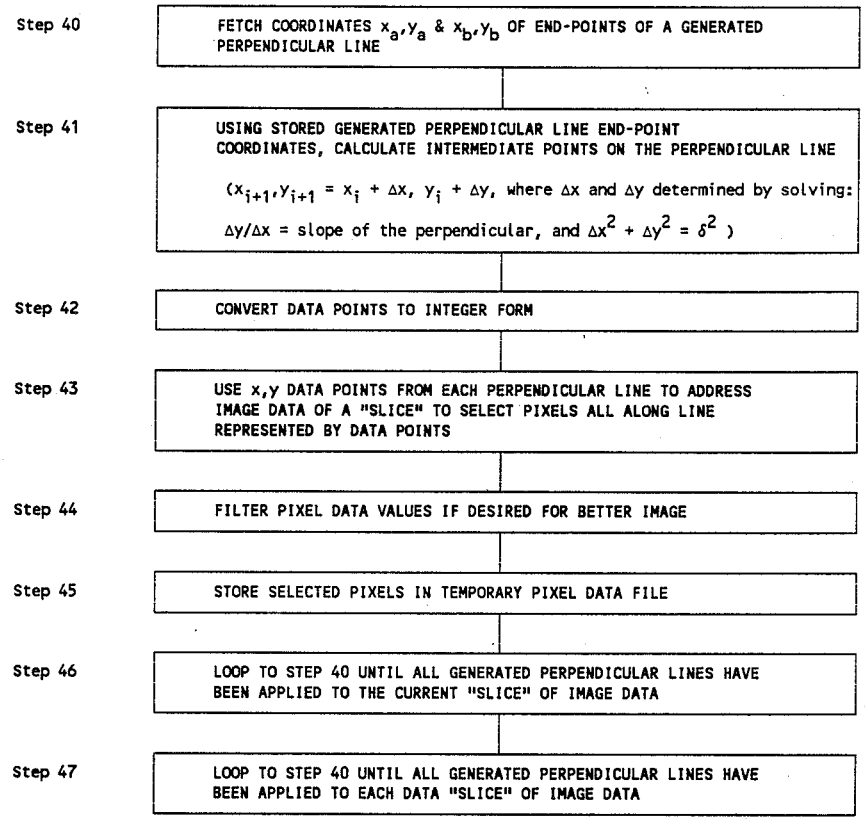
FIG. 4 is a flow chart of the Pixel Selection Along Generated Perpendicular Lines Procedure of the present invention.
Figure 5:
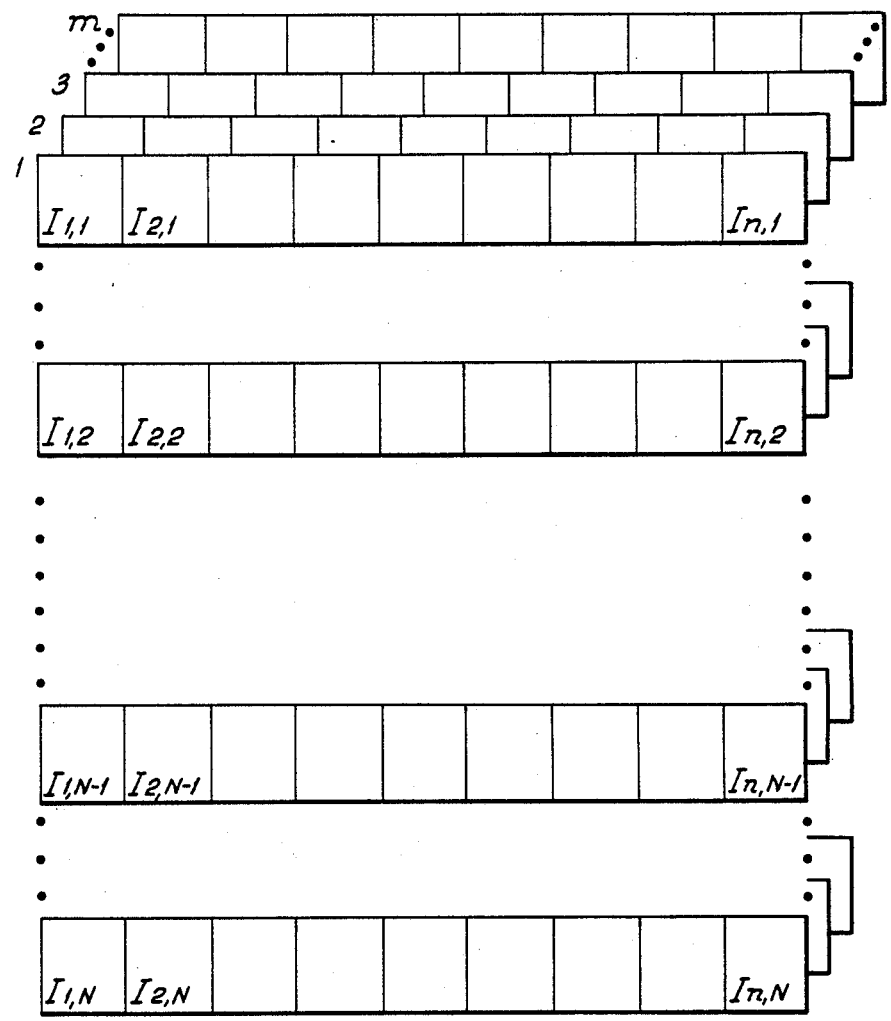
FIG. 5 is a diagram of a preferred file structure for temporarily storing selected image pixels.

FIG. 4 is a high-level flow chart describing the selection of pixels along the intersection of the generated perpendicular lines and a series of axial scanned data images. First, the coordinates of the endpoints of a first calculated perpendicular line are fetched (Step 40). Using those end-points, a number of discrete intermediate points lying along the perpendicular line and separated by a distance $\delta$ are calculated (Step 41).

The data points of the perpendicular line are converted from real to integer form (Step 42) in order to address and select the pixel values of a scanned data image (Step 43). If desired, each selected pixel value can be filtered (for example, by averaging a pixel value with some number of the surrounding pixel values) to enhance the image quality (Step 44). The selected pixels are temporarily stored in a pixel data file (Step 45), and the process loops to Step 40 until the data points of the each generated perpendicular have been applied to select underlying pixels from the current "slice" of image data (Step 46).

The entire process is then repeated for a next "slice" of image data (Step 47).

The preferred embodiment of the invention thus permits making a single pass through all axial image data, during which selected pixels for the perpendicular view are collected in a temporary data file for subsequent interpolation between axial slices.

The result of this process is the generation of a data file comprising uniform-length vectors containing pixel data corresponding to the intersection of each generated perpendicular line with each scanned data image (in this example, axial scanned data). The temporary file may thus be considered to be a three-dimensional collection of data, wherein the "x" dimension comprises pixel data corresponding to the intersection of one generated perpendicular line with a single image data slice, the "y" dimension corresponds to a stack of such pixel vectors, one for each image data slice, and the "z" dimension represents the cross-sectional perpendicular image generated from each of the perpendicular lines. FIG. 4 diagrammatically shows the structure of the pixel data file for "n" perpendicular line intervals, "N" image data "slices", and "m" perpendicular lines.

Since there is a fixed distance between each two consecutive image data slices, caused by the discrete stepping of the scanning device between the generation of each image, there is a space between the rows of pixels in the pixel data file corresponding to the "missing data" not obtained by the scanning device. In order to obtain the desired cross-sectional image with measurements scaled to the actual size of the scanned structure, interpolation between each pixel row is required to generate data to fill the space between each pair of rows, as well as to map the rows to display scan lines.

Figure 6:
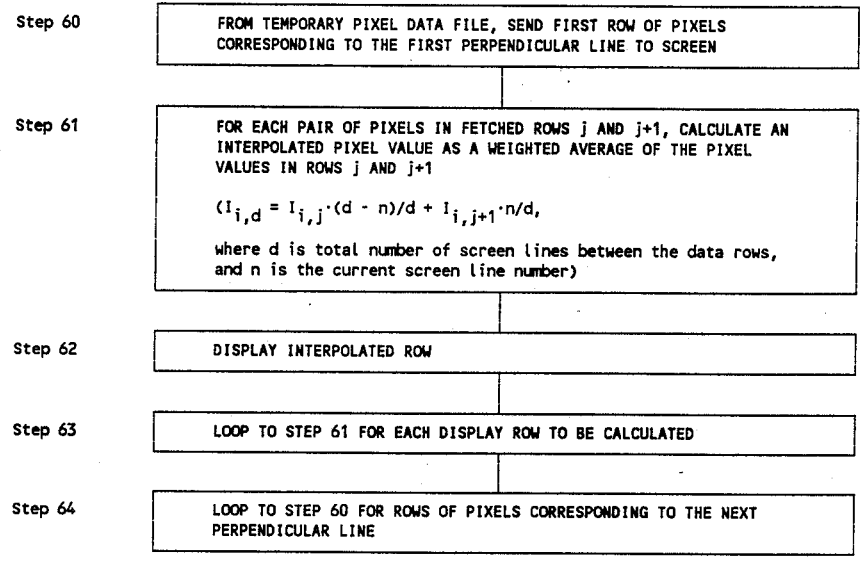
FIG. 6 is a flow chart of the Row Interpolation And Data Display Procedure of the present invention.

FIG. 6 is a high-level flow chart of the steps needed to generate cross-sectional synthesized images perpendicular to an initial curve conforming to the curvature of a scanned structure. As the first step in the interpolation process, the first row of pixel data is written to the display screen (Step 60). Then, corresponding pairs of pixel data for the first row of pixel data and the next row of pixel data are retrieved from the temporary file, and a weighted average of each pair of pixels is calculated for each screen display scan line between the stored pixel data rows (Step 61). For example, each row of pixel data may represent scans 1 mm wide taken 3 mm apart, leaving a "gap" between scans of about 2 mm. If each scan line of the display system is 0.5 mm wide, then each pair of pixel data rows must be interpolated to generate about six scan lines of display information.

Each intermediate interpolated scan line is then written to the display system (Step 62), and the process is repeated for each pair of rows in the pixel data file (Step 63). The process is then repeated for the next set of perpendicular line/image intersection data corresponding to the next generated perpendicular line (Step 64). The end result is a set of synthesized cross-sectional images perpendicular to a curve conforming to the curvature of a scanned structure.

The advantages of the invention include a reduction in the frequency of input/output requests to a relatively slow storage device, such as a hard disk, thereby accelerating program execution. In addition, the interpolation of pixel data along the intersection of each perpendicular line and a corresponding axial data image is done to a scale that is equivalent to the scale of the original generated axial images. Further, the perpendicular line interpolation, conducted at the point described above, speeds results by eliminating the need for a second pass through the axial-perpendicular line intersection pixel data.

Another advantage of the present invention is that the temporary file structure accelerates the production of perpendicular images. By sizing each pixel data vector to a fixed size, a stream of input data can be sent to a row interpolation process that is ideally suited for a software loop or processing in an array processor, or further acceleration using multi-processor computer architectures.

While a particular embodiment of the invention is described above, it should be understood that changes can be made without departing from the spirit or scope of the invention. For example, the order of some of the processing steps shown in the flow chart figures can be rearranged such that the same functions are accomplished without departing from the essence of the inventive method. Therefore, this invention is not to be limited to the specific embodiment discussed and illustrated herein, but rather by the following claims.

We claim:

1. A method for selecting and displaying image data corresponding to the intersection of (1) at least one generated line derived initial from an initial curve conforming to a set of initial data points input by a user, with (2) a set of image data produced in a two-dimensional field by a non-intrusive cross-sectional image generating device, comprising the steps of:
   a. calculating the coordinates of at least one primary data point on the initial curve;
   b. calculating the slope of a perpendicular at the calculated primary data points;
   c. at each of the calculated primary data points, calculating the coordinates of secondary data points a preset distance along a line having the calculated slope of the perpendicular, the secondary data points defining the at least one generated line derived from the initial curve;
   d. addressing the set of image data by the coordinates of selected ones of the secondary data points;
   e. selecting the image data at each such address; and
   f. displaying the selected image data on a display means as an apparent cross-sectional image.

2. The method of claim 1, wherein the initial curve is represented as a set of cubic spline coefficients.

3. The method of claim 2, wherein the set of cubic spline coefficients are in polar coordinate form.

4. The method of claim 1, wherein the step of selecting image data includes filtering the selected image data to enhance the displayed image.

5. The method of claim 1, wherein the step of displaying the selected image data further includes interpolating intermediate values of display data from the selected image data, and displaying such intermediate values relative to the selected image data to provide the apparent cross-sectional image.

* * * * *